Aug. 14, 1962 W. L. BALD 3,048,919
WHEEL MOUNTING TOOL
Filed Sept. 6, 1960
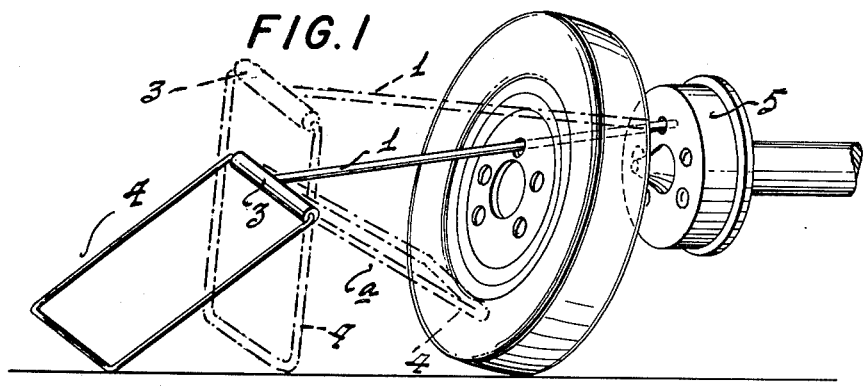
FIG.1
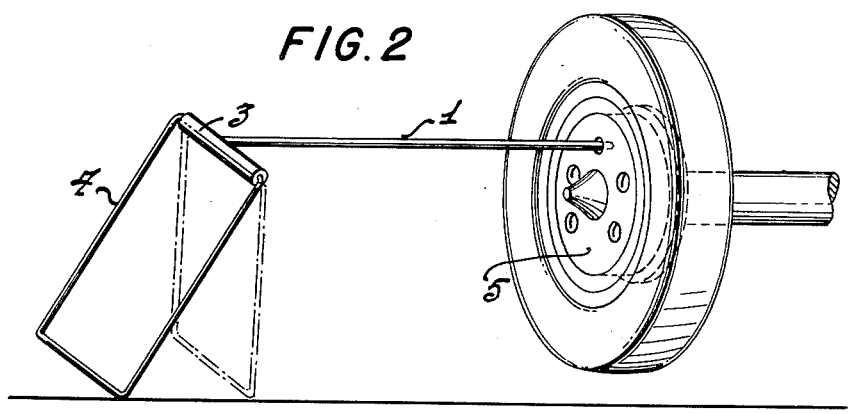
FIG.2
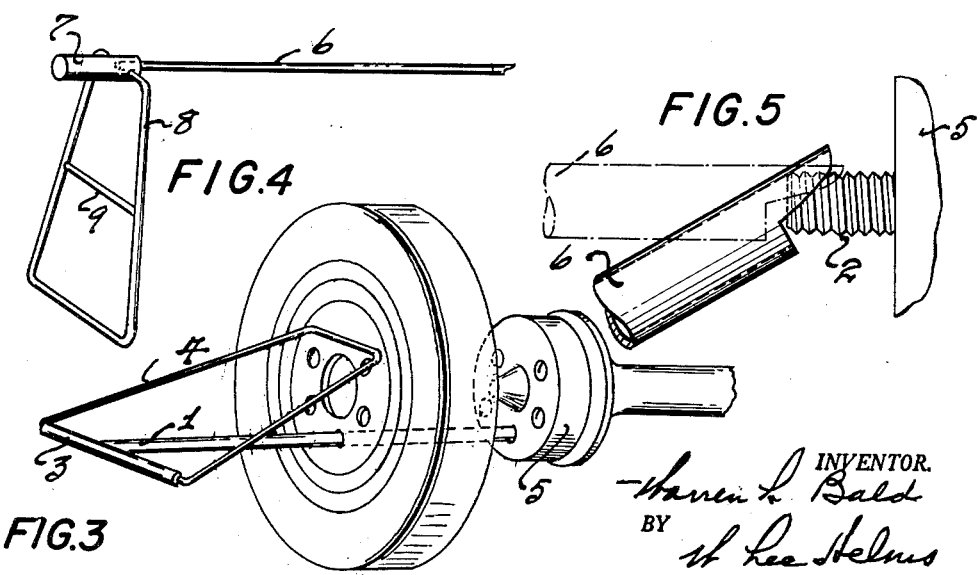
FIG.3
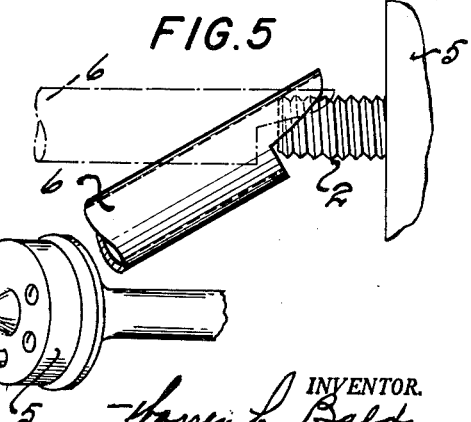
FIG.4
FIG.5
INVENTOR.
Warren L. Bald
BY
W. Lee Helms
ATTORNEY

United States Patent Office 3,048,919
Patented Aug. 14, 1962

3,048,919
WHEEL MOUNTING TOOL
Warren L. Bald, 704 W. California Ave.,
Glendale 3, Calif.
Filed Sept. 6, 1960, Ser. No. 54,192
1 Claim. (Cl. 29—273)

The object of the present invention is to provide an improved mounting tool for the wheels of automobiles and trucks, which provides not only a lifting rod lever but a combined stabilizing and supporting member for the wheel which controls initial tilting and swinging movements thereof in the application of the wheel to the hub drum structure of the vehicle.

The invention will be described with reference to the accompanying drawings in which:

FIG. 1 is a perspective view shown in full lines a hub structure carried by the axle of a vehicle and with an embodiment of the invention in position for operation to lift a wheel, the latter being shown in full lines, dotted lines showing said embodiment in two positions.

FIG. 2 is a view similar to FIG. 1, showing the wheel mounted on the hub and ready for securing bolts, dotted lines showing the supporting and stabilizing member moved to vertical position for support of the wheel while enabling the operator to use both of his hands in the initial threading in of the wheel supporting bolts.

FIG. 3 is a perspective view showing the said embodiment in a different position relative to the wheel, and with the supporting and stabilizing member contacting the wheel after the latter has been raised and illustrating the action of the latter in stabilizing the wheel against forward tilting, swinging or rotation.

FIG. 4 is a perspective view of an embodiment of the invention with the lifting rod lever formed with an end adapted for support upon a threaded stud of a common type of hub.

FIG. 5 is a schematic view showing in full and dotted lines the position of the lifting rod lever on a threaded stud of a hub.

Referring to the drawings, it will be seen that in the previous FIGURES 1, 2 and 3, the embodiment of the invention consists of a lifting rod lever 1 which may have its end plain to enter threaded apertures for receiving bolts, or which may have its end formed to be received by, and supported on, bolts such as shown in FIG. 5 at 2, carried by a well known form of wheel hub. Lifting rod lever 1 is carried by a handle 3, which in turn carries a swinging supporting and stabilizing member 4. The latter member may be made of a metal rod, strongly formed in generally U-shape, and having its ends bent towards each other and pressed into receiving holes formed in handle 3, although the swinging connection between the handle and the supporting and stabilizing member 4, may be as desired.

In the operation of the said embodiment, with the latter in the position of FIG. 1, the lifting rod lever, which is inserted in a top hole of the wheel drum 5 (or mounted on one of the studs 2 of FIG. 5), may be raised to the position of the dotted lines at the top of FIG. 1 and to such position that supporting and stabilizing member 4 may be swung to or toward the vertical. The wheel will thus be raised above the ground and held in such position, so that the operator may use both hands in positioning and bolting the wheel onto the drum 5. However, the supporting and stabilizing member has a further important function. Thus before raising the wheel, it may be stabilized against swinging or rotation by applying the stabilizing member against the wheel, according to its dotted line position at a, FIG. 1. With the wheel properly positioned by the stabilizing member, it may be pushed into registration with the hub 5, with both hands of the operator, by first moving the supporting and stabilizing member to vertical position.

In the modified structure shown in FIG. 4, the lifting rod lever 6 is axially connected to the end of a handle 7, the handle at its sides receiving the bent ends of the rod or rods, forming the swinging support 8, the latter having a central reinforcing rod 9. The end of the lifting rod lever 6 is formed to be received upon threaded stud 2 of FIG. 5, in any suitable manner. Thus the end of the lever may be cut and shaped with a curved undercut conforming with the curvature of the threaded stud. Of course, an adaptor having corresponding function may be applied to the lifting rod lever, if desired, and to receive such a threaded stud.

In FIG. 3, the structure of FIG. 1 is shown as employed with the lifting rod lever in the bottom hole of the hub drum and with the supporting and stabilizing member swung above the axis of the wheel to steady and stabilize the wheel, which is shown raised from the ground, preliminary to moving the wheel in bolting position upon the hub drum.

It will be understood that various modifications may be made in the elements of the embodiment shown, without departing from the spirit of the invention.

Having described my invention, what I claim and desire to secure by Letters Patent is as follows:

A wheel mounting tool comprising a lifting rod lever, a handle to which the lever is attached centrally thereof so that the handle extends to the sides of the rod, and a supporting and stabilizing member carried by the handle and adapted to swing relatively thereto, and adapted for rotation on the handle for contact with a wheel held by the lifting rod lever by passage through an aperture in the wheel and into engagement with a wheel receiving hub drum, said supporting and stabilizing member comprising a strong metal rod formed into generally U-shape with a relatively long section connecting the legs of the said U-shape and having the ends of its legs extended toward each other and received in holes provided at the ends of the handle, said stabilizing member being adapted to support the lifting rod lever by contact with a ground surface, and being adapted to be swung into contact with the wheel for stabilizing its position on said lifting rod lever, the said lever having a greater length than said supporting and stabilizing member.

References Cited in the file of this patent
UNITED STATES PATENTS
2,499,758    Kayfetz _____ Mar. 7, 1950
FOREIGN PATENTS
663,589    France _____ Apr. 9, 1929